United States Patent
Pal

(10) Patent No.: US 12,130,892 B2
(45) Date of Patent: Oct. 29, 2024

(54) UNIVERSAL OUTLIER DETECTION AND CURATION OF MISSING OR NOISY DATA POINTS

(71) Applicant: Brown University, Providence, RI (US)

(72) Inventor: Prasanta Pal, Shrewsbury, MA (US)

(73) Assignee: Brown University, Providence, RI (US)

( * ) Notice: Subject to any disclaimer, the term of this patent is extended or adjusted under 35 U.S.C. 154(b) by 0 days.

(21) Appl. No.: 17/819,114

(22) Filed: Aug. 11, 2022

(65) Prior Publication Data
US 2023/0070637 A1 Mar. 9, 2023

Related U.S. Application Data

(60) Provisional application No. 63/232,253, filed on Aug. 12, 2021.

(51) Int. Cl.
| | | |
|---|---|---|
| *G06F 16/00* | (2019.01) | |
| *G06F 16/215* | (2019.01) | |
| *G06F 18/2433* | (2023.01) | |
| *G06N 20/10* | (2019.01) | |

(52) U.S. Cl.
CPC ........ *G06F 18/2433* (2023.01); *G06F 16/215* (2019.01); *G06N 20/10* (2019.01)

(58) Field of Classification Search
CPC ... G06F 18/2433; G06F 16/215; G06N 20/10; G06N 20/00
See application file for complete search history.

(56) References Cited

U.S. PATENT DOCUMENTS

| | | | |
|---|---|---|---|
| 9,378,555 B2 | 6/2016 | Elgersma et al. | |
| 2005/0187643 A1* | 8/2005 | Sayyar-Rodsari | G05B 13/048 700/28 |
| 2015/0278241 A1* | 10/2015 | Bates-Haus | G06F 16/1748 707/692 |
| 2017/0236060 A1* | 8/2017 | Ignatyev | G06N 5/01 706/46 |
| 2018/0089442 A1* | 3/2018 | Kenthapadi | G06F 21/604 |

(Continued)

FOREIGN PATENT DOCUMENTS

| | | |
|---|---|---|
| CN | 105844102 A | 8/2016 |
| EP | 3175425 B1 | 10/2018 |

(Continued)

OTHER PUBLICATIONS

Yu-Hsuan Kuo et al., "Detecting Outliers in Data with Correlated Measures", Oct. 22, 2018, ACM, pp. 1-10 (Year: 2018).*

(Continued)

*Primary Examiner* — Jared M Bibbee
(74) *Attorney, Agent, or Firm* — ADLER POLLOCK & SHEEHAN P.C.

(57) ABSTRACT

A method includes receiving data, flagging outliers in the received data, each of the outliers representing extreme data values in the received data that stand out greatly from an overall pattern of data values at a given scale in the received data, storing the flagged outliers in an outlier file, removing the flagged outliers from the received data, curating the flagged data points with respect to various neighborhood kernel sizes, and further curating data points with small perturbations using contextual custom regression techniques as a second order refinement process.

5 Claims, 4 Drawing Sheets

(56) References Cited

U.S. PATENT DOCUMENTS

| | | | | |
|---|---|---|---|---|
| 2018/0089444 | A1* | 3/2018 | Kenthapadi | G06F 21/6254 |
| 2019/0087248 | A1* | 3/2019 | Pendar | G06F 11/004 |
| 2021/0081501 | A1* | 3/2021 | RoyChowdhury | G06F 40/295 |
| 2021/0349883 | A1* | 11/2021 | Majumdar | H04N 21/6582 |
| 2022/0035806 | A1* | 2/2022 | Horesh | G06F 16/2462 |
| 2022/0083816 | A1* | 3/2022 | Cmielowski | G06F 17/15 |
| 2022/0246457 | A1* | 8/2022 | Sundar | G06N 20/00 |

FOREIGN PATENT DOCUMENTS

| | | |
|---|---|---|
| WO | 2017120519 A1 | 7/2017 |
| WO | 2019108926 A1 | 6/2019 |

OTHER PUBLICATIONS

K. K. L. B. Adikaram et al., "Universal Linear Fit Identification: A Method Independent of Data, Outliers and Noise Distribution Model and Free of Missing or Removed Data Imputation", Nov. 16, 2015, pp. 1-18 (Year: 2015).*

Escalante, Hugo Jair, "A Comparison of Outlier Detection Algorithms for Machine Learning", Programming and Computer Software, Jan. 2005, 13 pages.

Pal, et al., "Statistical Outlier Curation Kernel Software (SOCKS): A Modern, Efficient Outlier Detection and Curation Suite", IEEE, Jul. 17, 2021, pp. 1-14.

* cited by examiner

UNIVERSAL OUTLIER DETECTION AND CURATION OF MISSING OR NOISY DATA POINTS

CROSS REFERENCE TO RELATED APPLICATIONS

This application claims benefit from U.S. Provisional Patent Application Ser. No. 63/232,253, filed Aug. 12, 2021, which is incorporated by reference in its entirety.

STATEMENT REGARDING GOVERNMENT INTEREST

None.

BACKGROUND OF THE INVENTION

The invention generally relates to raw signal acquisition, and in particular to a generic outlier detection and curation of missing or noisy perturbed data points suite.

In general, real world signal acquisition through sensors, is at the heart of modern digital revolution. However, almost every signal acquisition systems are contaminated with noise and outliers. Precise detection, and curation of data is an essential step to reveal the true-nature of the uncorrupted observations. With the exploding volumes of digital data sources, there is critical need for a robust, scaleable but easy-to-operate, low-latency, generic yet highly customizable, outlier-detection and curation tool, easily accessible, adaptable to diverse types of data sources. Existing methods often boil down to data smoothing or rejection of bad data points that inherently cause valuable information loss as well as distortion to good data points. Our key observation is that, pristine information retrieval from raw data based on multiscale regression models is a different class of problem than traditional averaging measure based data smoothing techniques.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In an aspect, the invention features a method including receiving data, flagging outliers in the received data, each of the outliers representing extreme data values in the received data that stand out greatly from an overall pattern of data values at a given scale in the received data, storing the flagged outliers in an outlier file, removing the flagged outliers from the received data, curating the flagged data points with respect to various neighborhood kernel sizes, and further curating data points with small perturbations using contextual custom regression techniques as a second order refinement process.

In another aspect, the invention features a method including, in a computer system having at least a processor and a memory, receiving contaminated data having a matrix-like structure or time-series structure that can be transformed into ASCII format to enable easy arithmetic or algebraic operations, the contaminated data comprising real data, background noise and outlier data, and curating the contaminated data on time domain to produce filtered curated data and outlier data.

In still another aspect, the invention features a method including, in a computer system having at least a processor and a memory, receiving contaminated data having a matrix-like structure in ASCII format, the contaminated data comprising real data, background noise and outlier data, and curating the contaminated data on spatial and temporal (as appropriate) domain to produce filtered curated data and outlier data.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other features, aspects, and advantages of the present invention will become better understood with reference to the following description, appended claims, and accompanying drawings where:

DETAILED DESCRIPTION

Figure 1:
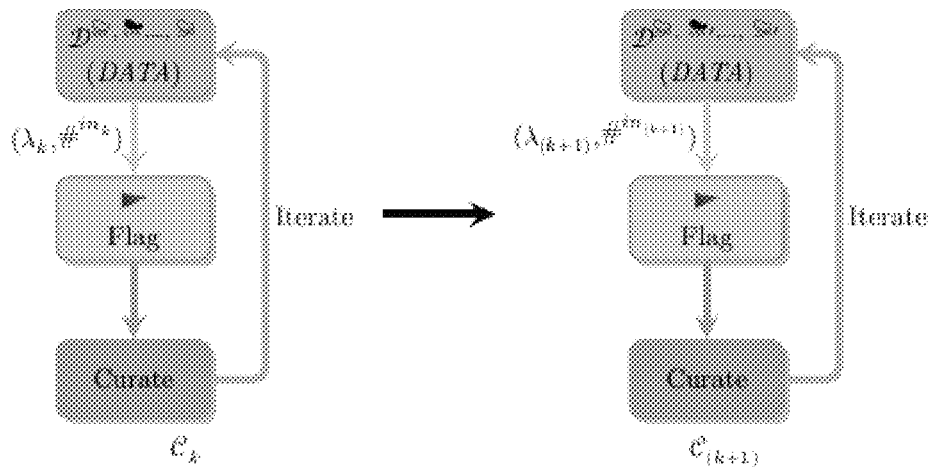
FIG. 1 is a schematic.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

The present invention is an information separation tool that is used, for example, to decontaminate time-series and matrix like data sources, with a goal of recovering the ground-truth. The tool decontaminates raw data first, through conditional flagging of outliers, schema-based curation of flagged data-points, followed by recovery of asymptotically converged ground-truth. This method immensely enhances the accuracy of a wide range of traditional data processing tasks.

The data-driven world of science, technology and medicine is so much deluged by countless engines of digital data collection processes that clarity is often profoundly blurred by the clout of over-information. It is more important than ever that, pursuit of information clarity is of far more importance than its mere volume. Clarity often comes through curation of the source level raw-input-data ($\mathcal{D}^{in} \in \{F, R\}$) originated at some transducers from a set of digital sensors ($\odot$).

Data, collected from natural-systems are often contaminated by various artifacts, background-noise and extremely deviant outliers that obfuscate the clarity of the underlying, presumably pristine, nature of the observed system. Noise is generally referred to as a systematic perturbation on observed measurements, whereas outliers or artifacts are considered as ad-hoc interruptions occurring at discrete time points (or spatial locations), or cases that are significantly deviant from a signal's central trends at a given scale of the time (time, space etc.). Typically, outliers are defined by data points deviating by more than a set number of standard deviations (e.g., often 3.0 for normal distribution) from a signal's central tendency measures (e.g., mean, median, mode etc.). A real-world example would be, the sound generated by the ongoing traffic on an otherwise quiet street can be considered as background noise, whereas the sounds emitted by honks at discrete time points would be considered outliers with respect to the otherwise natural equilibrium state of quietness. By contrast, the constant beeping sound of a cardiac pulse monitor could be considered as a signal of interest ( ▁▂▃ ) and any interruption of this rhythmic signal would be considered an outlier with respect to the natural rhythmic pulses. As a simple working definition, we'll consider steady state signals over a well defined period of time (or spatial range) as signal ▁▂▃, and any significant deviation from the central tendency measure as outliers.

The present invention is a method such that, outlier-detection and raw-data curation from noise and perturbations for a wide variety of data types are facilitated both offline as well as in real-time scenarios. There are two basic steps to achieve this goal: (a) Flagging (or detection) of the outliers and (b) curation of the flagged data-points. Optionally, the flagged (followed by curation) as well as the non flagged data points are further curated at all reasonable scales using contextual custom regression techniques as a second order refinement process. This is applied when large outliers are curated, or large outliers are not present and based on custom scale based analytical models that leads to high definition sampling of the underlying data.

During regular data-acquisition scenarios, the recording is typically done with a specified sampling rate ($\Omega$) and in EEG like sensors (e.g., array or montage of sensors), representative values of $\Omega$ are 256, 512, 1024, 2048, etc. In our case-studies involving time-series data (e.g., EEG), it is set to $\Omega=2048$. $\mathcal{D}^\circledast$ is read in a block-wise fashion and temporarily stored in a data-container ($\bowtie$) using the deque data-container. For simplicity, a data-block (or the scale) is represented as # and $N^\#$ as the number of instances of #. The size of #, is represented by $N^{\#in}$, and taken as an input parameter through a configuration-file. In practical situations, the parameter values would typically be set from the domain knowledge (e.g. spatial or temporal scales) of the system or the nature of the specific curation tasks. For example, if we want to curate a long signal train for very short time-scale chirps, $N^{\#in}$ would be only a few sample lengths and comparable to few times the sample-length of the chirp-size. On the other hand, for curation of a long-epoch, $N^{\#in}$ would scale with the length of the epoch.

We read the data from $\mathcal{D}^\circledast$ in a block-by-block fashion through the entire $\mathcal{D}^\circledast$. The total number of data-blocks ($\Sigma_\#$) is approximately proportional to the number of effective samples $N_{\mathcal{D}^\circledast}$ present in the data-source. For given values of $\mathcal{D}^\circledast$ and $\#^{in}$, the following relationship holds.

$$\Sigma_\# = \text{floor}\left(\frac{N^{\mathcal{D}^\circledast}}{N^{\#in}}\right) + \min\left(1, N^{\mathcal{D}^\circledast} \% N^{\#in}\right) \quad (1)$$

where, the $k^{th}$ data-block is represented as $^\#k \in \{1, 2 \ldots, \Sigma_\#\}$.

$N^\#_k$ is effectively the interrogation time-scale $\delta t_k$ for $\#_k$ upon which the median and MAD (or equivalently mean and standard deviation) parameters are calculated.

The following relationship holds $$\delta t_k = \frac{N^\#_k}{\Omega} \quad (2)$$

Typically, an outlier curation routine is performed by choosing a value of $\delta t_k$ and the curated output is obtained for that time-scale. We discuss only the temporal aspects of the operation, however, the spatial aspect of it follow a similar logic. A more sophisticated method would be to perform outlier curation at various scales in a sequential order. Importantly, as a general recommendation, shorter time-scale outliers should be removed first followed by relatively longer ones. Often, the system underlying $\mathcal{D}^\circledast$ is continuous in nature and discrete, ad-hoc division of a continuous system into discrete-blocks may introduce cosmetic discontinuity of trends in outcome-measures of consecutive data-blocks. To mitigate this kind of processing-artifacts, we introduce forward $\#^f$ and backward $\#^b$ overlap windows (or neighborhood window), data-blocks, the size of which are usually a percentage (~25%-50%) of $N^{\#in}$. So, the effective data-block length, including the overlap-windows in forward and backward directions $\#_k \rightarrow \hat{\#}_k$ $$N^{\hat{\#}}_k \approx N^{\#in} + N^{\#b} + N^{\#f} \quad (3)$$

All $N^\#_k$ s are uniform by design choice except, near the start and end of the data stream due to natural nuances around data boundaries (e.g., the number of samples may not be integer multiples of $\#^{in}$).

Robustness is intrinsically built into the method by incorporating relatively robust central measure, e.g. median ($\hat{\mu}$), and median absolute deviation ($\hat{\sigma}$ or simply MAD) or equivalently interl quantile distribution with appropriate order. These measures are minimally influenced by presence of extreme outliers and quantiles addresses asymmetries in distribution of signal values. We demonstrate a simple case study with median and median absolute deviation measures. We define modified z-score for value $x_k$ as below.

$$\hat{Z}_k = \frac{(x_k - \hat{\mu})}{\hat{\sigma}} \quad (4)$$

In the flagging step, any if for a given data point k, $(\text{abs}(Z_k) \geq \lambda)$ is satisfied, $x_k$ (or its location) is flagged (or labeled) as an outlier-candidate and staged to be curated in the subsequent steps if additional constraints (specific to the curation) are satisfied. Curation is not mandatory and the program may halt at the flagging stage if necessitated by the user. The outlier flags (denoted by NaNs or Not a Number) by themselves carry important information about the underlying system. Then, using non-NaN values we create a linear-regression interpolation (or any higher other order as appropriate) model to replace the NaN values (flagged data points) by constructing a model from the data-points in the neighborhood of the flagged points. As a vanilla case, we take advantage of armadillo library's built-in interp1 function that is optimized to fill in the flagged values from the unflagged, neighborhood data points. Interp1, additionally does extrapolation of the values if it is outside of the domain on which the model is built.

Optionally, we can extend the default the software settings is customized with built-in with static intializers into additional outlier detection procedures modalities based on other statistical measures like arithmetic mean, harmonic mean, mode or custom criteria specific to the underlying data-curation task based on guided by specific domain constraints (e.g., for images black backgrounds can be ignored if needed). The method includes a modern CPU architecture sensitive multi-threaded data-IO mechanism, coupled with appropriate data type conversions, matrix transformations, flagging, curation and iteration process. Efficient availability of data from the source $\mathcal{D}^{\approx}$ is facilitated by the multi-threaded environment through lock-based, mutex-enabled, synIO-synchronization mechanisms. The above steps can be done recursively for certain number of iterations ($_R$). Once the targeted iterations are finished (or by any other run time condition), the flagging and curation steps may continue by piping the data from the last curated output as input and potentially with a different parameter tuple e.g. ($\lambda$, $\#^{in}$, $_R$). We call it cascading with a parameter tuple. The method also allows, multiple processing cascades ($C_k$) to be sequentially staged by cascading flagging, curation and iteration steps in a serial fashion. FIG. 1 describes the steps for a given cascade level and the number of cascades $N^{C_{k\in\{1,2,\ldots,P\}}}$ needed for a specific curation objective and can be defined through the configuration file. More specifically, FIG. 1 illustrates a schematic representation of two consecutive curation cascades $C_k$ & $C_{(k+1)}$ applied in sequence.

ASCII data is read from $\mathcal{D}^{\approx}$ in floating point (or double precision) format. It is reasonable to presume that, the default data arrangement is column-wise in the sensor space and row-wise in the temporal space (or matrix form in case of image like structures). Each row is an individual record of the uniformly sampled data. Traditionally, the data may contain few meta-data header-lines at the beginning. Depending upon the circumstances, the header information may be utilized for calibration (e.g., sampling rate, image dimensions etc.) or may be discarded as well. In principle, there may be extraneous columns present in $\mathcal{D}^{\approx}$ than those deemed relevant for processing and may be discarded as well by setting appropriate boundaries of the data through the configuration-file. The curation is performed on the effective samples $N_{\mathcal{D}^{\approx}}$ that are candidates for actual processing (or ROI). It is a sub-matrix of the original $\mathcal{D}^{\approx}$. The file or the stream often comes with auxiliary information, time-stamp, serial no., etc., channels and it is important to discard the indices of those channels if deemed unnecessary. Also, often the first few lines of the data file may contain header information (e.g. file type, channel description, $\Omega$ etc.) and we discard these lines for actual processing. The zero time stamp starts at the first sample of the actual data after the header. In case of a file structure, if the input file contains few lines of header information, we skip those lines from processing.

The underlying design principles are, easy availability (open-source), flexibility, scalability (can handle large data from diverse sources), adaptability (various input data formats, new filter implementations), low-latency, and robustness (works even in the presence of extreme values of data). It can be used either as a stand-alone tool for offline-processing or as a plugin to real-time systems through file or streaming interfaces. The flexibility is achieved by parametric curation of $\mathcal{D}^{\approx}$ where, important parameters (e.g., input file, config file, etc.) are fed into the software through a combination of command-line options. Additional parameters are taken from a configuration file designed using JSON structure. The command-line options and JSON parsing are done using open-source cxx-opt and json-cpp libraries respectively.

Figure 2:
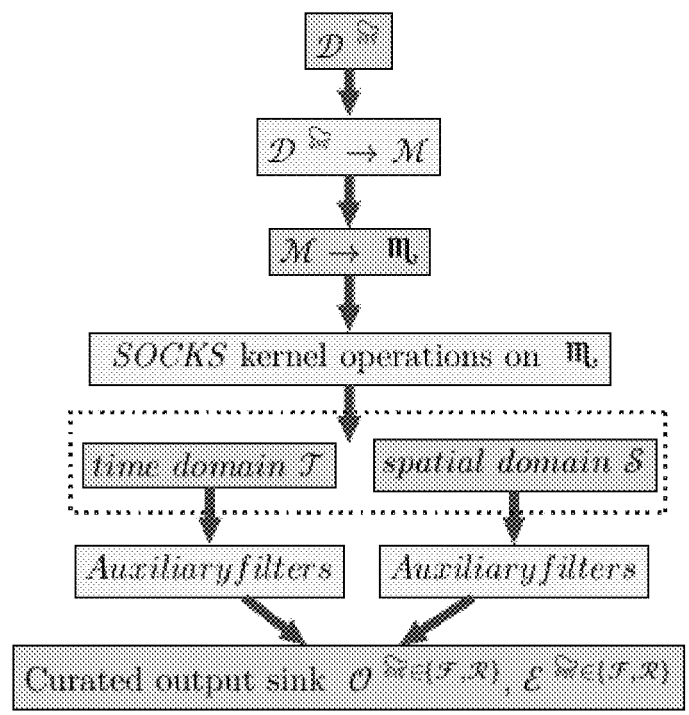
FIG. 2 is a flow diagram.

Highly efficient matrix-data processing mechanism facilitated by armadillo linear algebra library at the heart of the software implementation method. From the input raw data matrix ($\mathcal{M}$) it is trivial to create a reference submatrix sub-matrix $\mathfrak{m}$ containing only the absolutely necessary chunk of data to be curated by the method's kernel. $\mathfrak{m}$ is constructed from $\mathcal{M}$ by taking into account appropriate row and column index ranges. The input data is presumed to be in a columnar manner separated by standard field separators (e.g., space, comma, etc.) where each column represents time-series data from each individual sensor whereas each row is a single snapshot record of the measurement. As illustrated in FIG. 2, the operations on $\mathfrak{m}$ are divided into two primary categories based on the respective operational domain of the data a) time-domain $\mathcal{T}$ b) spatial-domain $\mathcal{S}$, where contaminated time-series data is taken as an input field having a matrix-like structure in ASCII format. The method curates the data either on time domain or spatial domain (or image) to produce filtered curated data while separately storing the outlier data-points as well.

More specifically, there are two sets of output for each pass of curation, i.e., curated data and outlier data. Both curated data and outlier data carry distinct information about the data.

Figure 3:
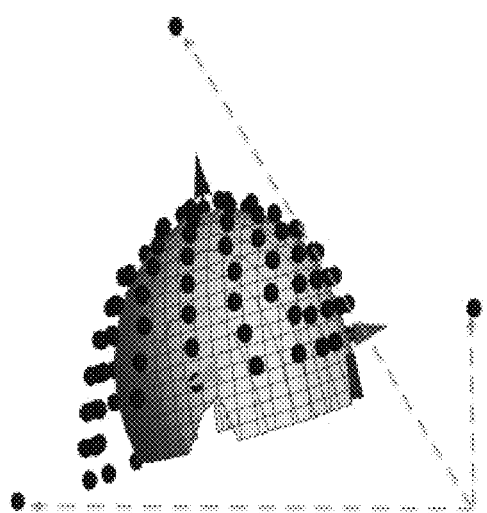
FIG. 3 is another schematic.

FIG. 3 is one example data source from a brain electroencephalogram (EEG) and illustrates the spatial arrangements of EEG sensors where the data points are generated from sensors placed on the head-model of standard EEG data-acquisition systems, where the solid arrowheads represent the Cartesian coordinate system (x, y, z) and the tip of the dashed arrows indicate representative outlier data points. x (y) directions point towards the right (left) ear and z direction towards the top of the head. Due to natural hemi-spherical geometry of human-head model, any individual sensor or a group of them may produce outlier data but it can be recovered in the context of S, by constructing a sensor proximity map from the inter-geodesic distances between sensors. In principle, inter-geodesic distances can be replaced by any other suitable distance measure e.g., inter-sensor dynamic correlation, functional proximity (e.g. how functionally close two sensor locations are) etc. When spatial curation is under consideration, this map is optionally taken as an input from the configuration-file. For the purpose of brevity, we would discuss the $\tau$ domain operations only, however, S domain operations are done in an equivalent fashion except for few additional elements like sensor proximity map etc. The scalability of processing load depending on available resources was ensured by utilizing a multi-threaded processing framework, paired with block-by-block data-reading, processing and asynchronous storage protocols. At the initialization stage of the software a thread-pool ($\boxplus$) of size $_{\mathcal{N}\boxplus}$ is allocated so that computation can be delegated to various hardware threads when necessary, while avoiding expensive thread-creation and destruction operations. Generally, $_{\mathcal{N}\boxplus}$ scales with the number of cpu-cores of the host-device for processing. A run-time data-block container $\bowtie$ internally having the deque data structure, is maintained as a container of $\#_k$s throughout the lifetime of the data-processing task, so that it acts as the interface between the $\mathcal{D}^{\approx}$ and the data-processing-module while reducing the data-loading time from $\mathcal{D}^{\approx}$ by making the data-block readily available in the hardware memory.

Before the data-processing operation starts, ⋈ initialized to be in a filled state of ⋈ size $_{N^{\bowtie}} \geq 3$ whereas, the maximum size of $_{N^{\bowtie}}$ is determined by the choice of memory footprint of the software as pre-defined in the configuration-file. The front element of ⋈ is popped for processing while an asynchronous request is made to read the next data block from the $_{\mathcal{D}^{\bowtie}}$ to be pushed (or en-queued) in partially empty ⋈. Before the push or pop operation, ⋈ is locked with a mutex. This way the wait time to read data from the $_{\mathcal{D}^{\bowtie}}$ is avoided while the processing happens simultaneously on a separate thread of ⚙. The following schematic sequence 16 describes different states of the data-block container from the initial empty ⋈, followed by complete filling and consecutive popping and pushing of $\#_k$'s from data-container ⋈ until all the data is exhausted. It is to be noted that, the following is an in memory architecture and the same can be accomplished with the help of a standard database for cloud applications.

⋈ ⋈ ⋈ ⋈ ⋈ ⋈ ... ⋈ ⋈ ⋈ ... ⋈ ⋈

The output as well as outlier instances are asynchronously stored through an output data sink ($\mathcal{O}$) interface that can optionally be piped to a data file or a streamer, e.g., lab-streaming layer (LSL)). The adaptability to variations of data formats is achieved by first reading each line of the input data as a fresh record in the format of a string. String being one of the most universal data types, any kind of ASCII data files can be read in a line by line fashion. Then the data parsing is done by utilizing the data-domain boundaries contained as the actual experimental details of $\mathcal{D}^{\bowtie}$. As a concrete example, we used EEG data samples collected from Biosemi systems where, the first column usually have time stamp information, mid columns have sensor data information, and the last few columns may have auxiliary or external trigger information. In most practical scenarios, only a subset of these data columns are relevant and our method would parse it as per data-boundaries set through the config file. The low-latency and efficiency goal was achieved by using, highly optimized, low-level, multi-threaded, compiled C++ language with modern standards (−std≥11) that intrinsically supports minimization of expensive data copy through the modern syntax introduced in standard 11. By move semantics, reference passing and perfect forwarding principles, the need for expensive data copying was partially if not completely eliminated and every unique piece of data is guaranteed to reside in a single memory location. It is to be noted that, the introduction of move semantics and perfect forwarding, native language level multi-threading, enabled a very powerful interface to build efficient, close to metal real-time modern software. Parallelized OpenMP-loops, were used in appropriate code-blocks to make it even more efficient. Additionally, multi-purpose linear-algebra library armadillo has been heavily utilized to facilitate a diverse variety of highly complex but efficient matrix as well as data transformation operations. One big advantage of the armadillo library is that, it creates a natural interface to form sub-matrix views using references such that any operation on a sub-matrix does not require expensive data copy operation. This has a significant impact on the efficiency of the method because the $\mathcal{D}^{\bowtie}$ is often either imported from file on the hard drive or from a live-stream that in its raw form, belongs to a higher dimensional sensor space than the subspace of the matrix where ⚙ of interest belongs.

Without the reference based sub-matrix view, we have to perform expensive and memory intensive copy operations. Functional operations/transformations are performed on a reference based sub-matrix structure of the imported $\mathcal{D}^{\bowtie}$ in the form of matrix. In case of streaming data we added the interface to stream the output to outgoing data-stream clients. In one embodiment, we implemented only the outgoing data-streaming, identified by the name and type of the stream. These parameters can be trivially modified in the configuration-file as needed by specific situations. The incoming data-stream can be easily implemented but we skip it in the current version for the sake of simplicity. It is to be noted that, output from the method described above (e.g., curated data) can be further processed internally using traditional auxiliary filters (e.g., Gaussian, Poisson, etc.). For illustration purpose, we included an implementation of half-Gaussian filter that can be used optionally by turning on or off appropriate flags.

Most, if not all, time-series data are intrinsically multi-scale in nature. EEG or similar data-sources, under equilibrium measurement settings, may get intermittently polluted by outliers with varied time-scales. One practical problem is, reliable detection of the various time-scale specific outliers, despite significant variations of its temporal length-scales (e.g. $\tau_1$, $\tau_2$ & $\tau_3$). One way to address this problem is to per-determine a set of time-scales ($\tau \in \{\tau_1, \tau_2$ & $\tau_3\}$) to isolate temporal spans of the outliers. The parameters of the curation task, are appropriately adjusted specific to those time-scales, followed by the flagging, curation, iteration and cascading steps. Depending the outcome objectives, users have complete freedom to determine how many cascades of the curation are appropriate. This can be performed by sequentially applying the flagging and curation algorithms for each time-scale, followed by piping the output of the most recent elemental curation task to the input of the next curation step.

The present invention can be used in multiple data-contexts beyond EEG time-series data including audio time series or image-processing where raw-image is transformed into a data-matrix of gray scale pixel-intensities (or in case of color image color plane matrices). In the context of image-processing it would be a very effective tool to perform both flagging and curation steps through iteration and cascading by choosing appropriate kernel-radius (K) and λ-values.

The method described for time-series data is easily adapted to image-processing problems for filtering and segmentation tasks. All that is needed is to transform a raw image into data-matrix using OpenCV based imread function followed by conversion to armadillo matrix. armadillo library has a very advanced data-io facility associate with state of the art matrix operations.

Figure 4:
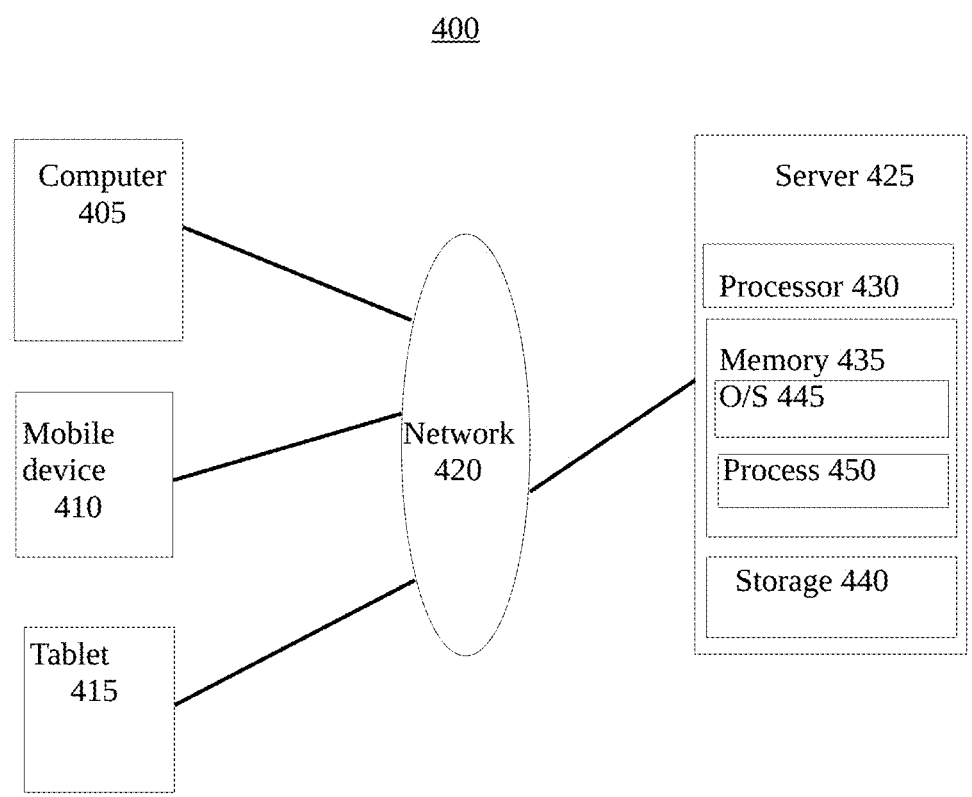
FIG. 4 is a block diagram of an exemplary system.

As shown in FIG. 4, an exemplary system 400 includes a computer system 405, a mobile device 410, and a tablet computing device 415. The computer system 405, the mobile device 410, and the tablet computing device 415 and linked to a network 420 of interconnected computer systems (e.g., Internet) via wired or wired communication links. The network 420 includes at least one server 425. Each of the computer system 405, the mobile device 410, and the tablet computing device 415 include at least a processor, a memory, an input/output (I/O) device and a storage device. Memories in each of the computer system 405, the mobile device 410, and the tablet computing device 415 include at least a process, sometimes referred to as an application ("App") to enable interaction with the server 425.

The server 425 includes at least a processor 430, a memory 435, and a storage device 440. The memory 435 includes at least an operating system 445 and an outlier detection and curation suite process 450.

Figure 5:
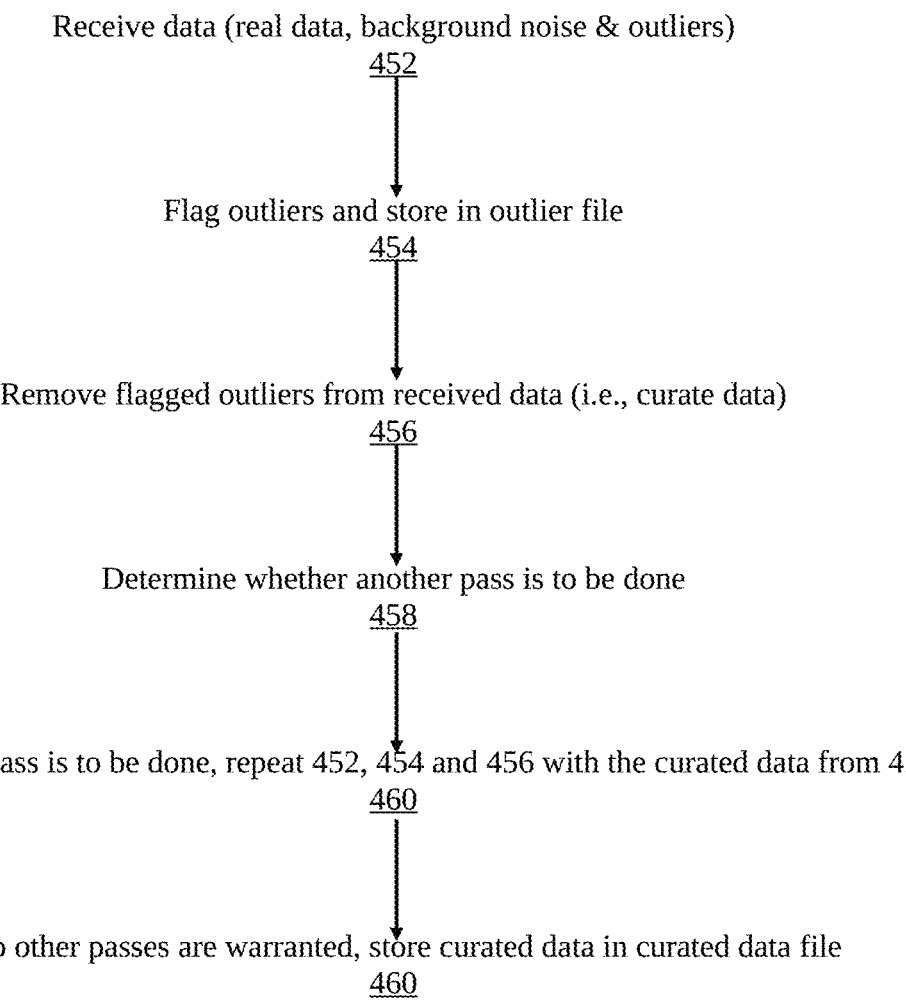
FIG. 5 is another flow diagram.

As shown in FIG. 5, the outlier detection and curation suite process 450 includes receiving (452) data (real data, background noise & outliers).

Process 450 flags (454) outliers and stores (456) them in an outlier file.

Process 450 removes (458) the flagged outliers from received data (i.e., curates data).

Process 450 determines (460) whether another pass is to be done.

If another pass is to be done, process 450 repeats the receiving, flagging and removal with the curated data.

If no other passes are warranted, process 450 stores (462) the curated date in a curated data file.

More specifically, steps 452 through 460 are repeated for a different set of curation flags (e.g., threshold, scale) by taking the curated data in step 460 as input and feeding it back to step 452 through a data feedback loop.

In summary, the present invention is a low-latency, robust, method to curate large volumes of time-series data without any practical limitations on the size of the input data source (streaming or data files). After operating on the raw-data followed by curated-data in an iterative and cascaded fashion, the output is separately stored in curated and outlier signal files for each iteration cycle within a given cascade.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A method comprising:
   in a computer and network system having at least a processor and a memory, sensor or data sources receiving data;
   flagging outliers in the received sensor or data sources data, each of the outliers representing extreme data values in the received data that stand out greatly from an overall pattern of data values at a given local scale of time or space with respect to each of the received sensor or data sources data;
   storing the flagged outliers in an outlier file;
   removing the flagged outliers from the received data;
   curating the flagged data points with respect to pre-defined or user-defined local neighborhood kernel sizes;
   further curating data points with small perturbations that are less than three standard deviations and therefore not flagged outliers using contextual custom regression techniques as a second order refinement process;
   determining whether additional flagging of outliers is needed;
   if additional flagging of outliers is needed, utilizing curated data points as input to a further iteration of flagging; and
   curating in a recursive fashion until discovery of new outliers becomes insignificant or a user terminates curating.

2. The method of claim 1 wherein if flagging of outliers is further needed with a different set of parameters, after receiving data from the removed flagged outliers;
   flagging additional outliers in the received data with respect to a new set of curation parameters;
   storing the additional flagged outliers in the outlier file as an ordered series outliers at each flagging and curation step;
   removing the additional flagged outliers from the received data; and
   curating them further if needed.

3. The method of claim 2 further comprising:
   storing the data without outliers in a curated data file as a final result or set of final results depending on the depth and order of curation.

4. A method comprising:
   in a computer system having at least a processor and a memory, receiving contaminated raw-data transformed into a matrix-like structure in ASCII format or converted to raw data format, the contaminated data comprising real data, background noise and infused with outliers data;
   iteratively curating the contaminated data on time or spatial domain to produce filtered curated data and outlier data with minimal information loss, wherein iteratively curating the contaminated data comprises flagging outliers, each of the outliers representing extreme data values that stand out greatly from an overall pattern of data values at various scales, storing the flagged outliers in an outlier file, and removing the flagged outliers from the contaminated data;
   determining whether additional flagging of outliers is needed; and
   if additional flagging of outliers is needed, receiving data with the removed flagged outliers, flagging additional outliers in the received data, storing the additional flagged outliers in the outlier file, and removing the additional flagged outliers from the received data.

5. The method of claim 4 further comprising:
   storing the data without outliers in a curated data file.

* * * * *